Oct. 28, 1930. T. ZOULEK 1,780,055
HAND PLANTING IMPLEMENT
Filed Aug. 15, 1929
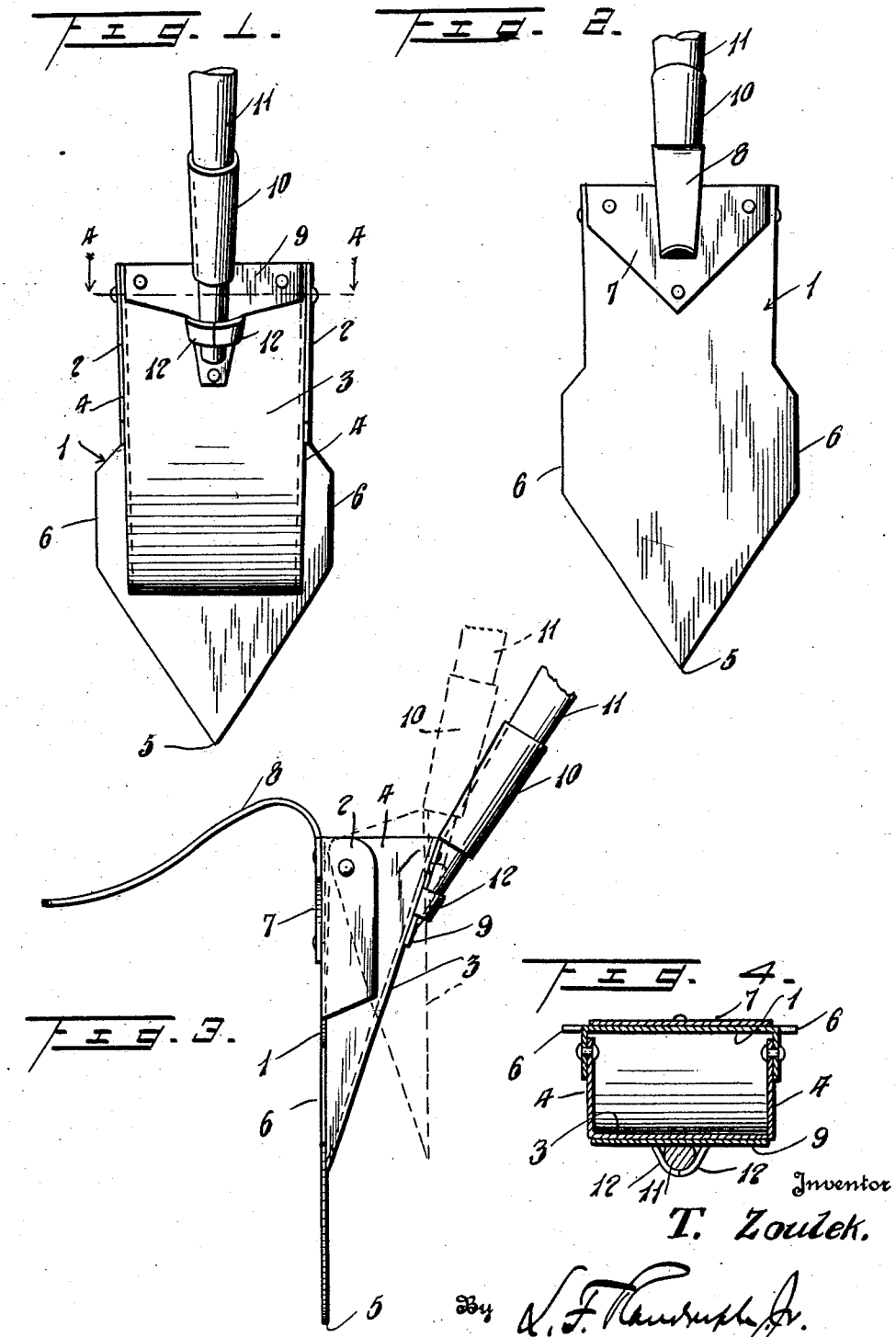

Patented Oct. 28, 1930

1,780,055

UNITED STATES PATENT OFFICE

THEODORE ZOULEK, OF MUSKEGON HEIGHTS, MICHIGAN

HAND PLANTING IMPLEMENT

Application filed August 15, 1929. Serial No. 386,148.

The invention relates to a farm implement and particularly to an implement for planting seed potatoes and the like and has for its object the provision of an implement provided with means for severing roots in advance and on each side of a container for the seed potato or the like, the receptacle to contain the seed comprising two relatively movable members to drop the seed into an opening prepared therefor by the implement, the device being adapted for operation by hand.

The invention will be described in detail hereinafter and will be found illustrated in the accompanying drawings in which Figure 1 is a front view of the improved potato planter, the handle being shown fragmentarily, Figure 2 is a rear view, Figure 3 is a side view, and Figure 4 a horizontal sectional view on a plane indicated by the line 4—4 of Figure 1.

In the drawings similar reference characters are used to designate corresponding parts throughout the several views.

The improved seed planter comprises a blade 1 having the upper portion of its side edges bent at right angles to the surface of the blade forming ears 2 between which are pivoted a trough 3 having its side walls 4 tapered downwardly said trough forming with the blade 1 a receptacle to receive the seed potato or other seeds for planting. Blade 1 is extended below the lower edge of the trough 3 an appreciable distance and is tapered to a point as shown at 5, while the sides of the blade 1 below the ears 2 are extended laterally as shown at 6. Secured to the upper and rear face of the blade 1 is a plate 7 having a tongue 8 extended rearwardly and downwardly therefrom, said tongue 8 being adapted to be utilized for pushing the blade into the soil by means of pressure by the foot of the operator. Secured to the upper outer surface of the base of the trough 3 is another plate 9 on which is a tubular socket 10 to receive the end of the handle 11, the lower extremity of the handle 11 being engaged by inwardly bent tongues 12 cut from the plate and bent to engage the extremity of the handle.

In use when the seed potato is deposited in the receptacle formed by the trough 3 and blade 1 and the blade 1 is driven down by pressure on the tongue 8, the pointed end 5 of the blade will enter the soil and cut the roots and other trash in advance of the blade, the laterally extended portion 6 also cutting the roots at the sides of the lower portion of the trough 3 thus separating the soil and providing for the uninterrupted growth of the seed deposited in the soil. After the blade 1 is driven in the soil as stated, the handle 11 is actuated to pull the trough 3 into the position shown in broken lines in Figure 3 to open the trough and to permit escape of the seed in the trough and the implement is then withdrawn leaving the seed in the soil.

What is claimed is:—

A seed potato planter, comprising a flat blade, a tongue extending rearwardly from the upper edge of the blade providing means for sustaining pressure for driving the blade into the ground, ears on the upper portion of the blade, a channeled member pivotally mounted between said ears, the sides of said channeled member being downwardly tapered, said channeled member and the blade providing a receptacle for seed potatoes, a handle secured to said channeled member, the sides of said blade below said ears being wider than the remainder of the blade and extended beyond the channeled member, and the lower edge of said blade extending below the channeled member and tapered.

In testimony whereof I affix my signature.

THEODORE ZOULEK.